(12) United States Patent
Vankamamidi et al.

(10) Patent No.: US 11,226,774 B2
(45) Date of Patent: Jan. 18, 2022

(54) DEEP DATA-COMPRESSION

(71) Applicant: EMC IP Holding Company LLC, Hopkinton, MA (US)

(72) Inventors: Vamsi K. Vankamamidi, Hopkinton, MA (US); Philippe Armangau, Acton, MA (US); Daniel E. Cummins, Hudson, NH (US); Steven A. Morley, Mendon, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 70 days.

(21) Appl. No.: 16/656,046

(22) Filed: Oct. 17, 2019

(65) Prior Publication Data

US 2021/0117132 A1 Apr. 22, 2021

(51) Int. Cl.
*G06F 3/06* (2006.01)
*G06F 12/02* (2006.01)

(52) U.S. Cl.
CPC .......... *G06F 3/0661* (2013.01); *G06F 3/0608* (2013.01); *G06F 3/0689* (2013.01); *G06F 12/0253* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 9,779,023 B1 | 10/2017 | Armangau et al. | |
| 9,985,649 B1 | 5/2018 | Bassov et al. | |
| 10,116,329 B1 * | 10/2018 | Bigman | H03M 7/6094 |
| 10,176,212 B1 * | 1/2019 | Prohofsky | G06F 3/0605 |
| 10,346,064 B1 | 7/2019 | O'Hare et al. | |
| 10,365,828 B1 | 7/2019 | Armangau et al. | |
| 10,402,091 B1 | 9/2019 | Vankamamidi et al. | |
| 10,402,096 B2 | 9/2019 | Sen et al. | |
| 10,437,474 B1 | 10/2019 | Armangau et al. | |
| 10,467,222 B1 | 11/2019 | Kuang et al. | |
| 10,498,355 B2 | 12/2019 | Hong et al. | |
| 2005/0071579 A1 * | 3/2005 | Luick | G06F 12/0802 711/154 |
| 2016/0371190 A1 * | 12/2016 | Romanovskiy | G06F 3/064 |
| 2017/0206024 A1 * | 7/2017 | Rezaei | G06F 3/0679 |
| 2017/0364529 A1 * | 12/2017 | Fagiano | H04L 67/1097 |
| 2018/0074723 A1 * | 3/2018 | Delaney | G06F 3/0608 |
| 2020/0393968 A1 * | 12/2020 | Kawase | H03M 7/30 |

* cited by examiner

*Primary Examiner* — Jared I Rutz
*Assistant Examiner* — Marwan Ayash
(74) *Attorney, Agent, or Firm* — BainwoodHuang

(57) ABSTRACT

Host data stored in one or more source physical extents of non-volatile data storage is identified as valid and determined to be infrequently written by host I/O requests, and is therefore compressed to generate a highly compressed version of the valid host data. The highly compressed version is then stored into at least one target physical extent. The valid host data may be initially compressed before it is stored in the source physical extent(s), and may be recompressed to generate the highly compressed version. If the valid host data is also infrequently read, it may be recompressed using larger blocks of host data than were used to perform the initial compression. The performance tier of the target physical extent may be different from (e.g. lower than) the performance tier of the source physical extent. The technology may be embodied in a background process such as a garbage collector.

18 Claims, 6 Drawing Sheets

DEEP DATA-COMPRESSION

TECHNICAL FIELD

The disclosed technology relates generally to achieving deep data-compression in a data storage system, and more specifically to technology for performing deep data compression during background processing in a data storage system.

BACKGROUND

Data storage systems are arrangements of hardware and software that include and/or access non-volatile data storage (e.g. electronic flash drives, magnetic disk drives, and/or optical drives, cloud storage, etc.) that is used to provide non-volatile storage for processing I/O (Input/Output) requests (i.e. writes and/or reads) that are received from one or more hosts (e.g. host computers and/or applications executing thereon). The host I/O requests that are processed by a data storage system may include block I/O requests as well as file I/O requests. The host I/O requests indicate host data in storage objects (e.g. logical volumes) of non-volatile data storage that are contained in and maintained by the data storage system. The data storage system may also perform various data storage related services that organize and secure the host data on the non-volatile data storage of the data storage system.

SUMMARY

An important performance objective for a data storage system is to provide a high level of data reduction with regard to the host data that it receives and stores in non-volatile data storage. One way for a data storage system to provide data reduction is through lossless data compression. Higher levels of data compression enable the data storage system to store larger amounts of host data. Some previous data storage systems have attempted to perform data compression on host data as it is received in host I/O requests, prior to storing a resulting compressed version of the host data into non-volatile data storage. Another important performance objective for a data storage system is to provide a high level of throughput with regard to processing host I/O requests. These two performance objectives may conflict with each other, since performing high levels of data compression is typically very expensive in terms of central processing unit (CPU) utilization, and may accordingly conflict with the data storage system's ability to provide high throughput levels when processing host I/O requests.

It would accordingly be desirable to have technology that provides a high level of data compression for host data that is stored by a data storage system, without negatively impacting the ability of the data storage system to rapidly process host I/O requests as they are received.

To provide improvements with regard to the above described and other technical shortcomings of previous systems, new technology is disclosed herein that identifies valid host data that is stored in at least one source physical extent of non-volatile data storage, and determines whether the valid host data is infrequently accessed by host I/O write requests. In response to a determination that the valid host data is infrequently accessed by host I/O write requests, the valid host data is compressed to generate a highly compressed version of the valid host data. The highly compressed version of the valid host data is then stored into at least one target physical extent of non-volatile data storage.

For example, the valid host data may be initially compressed by first compression logic to generate an initially compressed version of the valid host data that is stored into the non-volatile data storage. Compression of the valid host data to generate the highly compressed version of the valid host data may include or consist of re-compressing the valid host data by second compression logic that is different from the first compression logic, where re-compressing the valid host data by the second compression logic provides a higher level of data compression than was provided by the initial compression performed by the first compression logic, such that the highly compressed version of the valid host data is smaller than the initially compressed version of the valid host data.

In another example, the valid host data may initially be compressed by the first compression logic in blocks of host data having a first size. Further in response to determining that the valid host data is infrequently accessed by host I/O write requests, the disclosed technology may determine whether the valid host data is also infrequently accessed by host I/O read requests. In response to determining that the valid host data is also infrequently accessed by host I/O read requests, the disclosed technology may re-compress the valid host data using the second compression logic in blocks having a second size, where the second size is larger than the first size.

In another example, the non-volatile data storage may include multiple performance tiers of non-volatile data storage devices, including a first performance tier containing one or more non-volatile data storage devices and a second performance tier containing one or more other non-volatile data storage devices, where the non-volatile data storage devices in the second performance tier have lower performance than the non-volatile data storage devices in the first performance tier. The source physical extent(s) may be located on one or more non-volatile data storage devices in the first performance tier. Further in response to determining that the valid host data is infrequently accessed by host I/O write requests, the disclosed technology may allocate the target physical extent(s) from the second performance tier, such that the target physical extent(s) is/are located on one or more non-volatile data storage device in the second performance tier.

In another example, the disclosed technology may determine whether the valid host data is infrequently accessed at least in part by i) determining an amount of time since host data stored in the source physical extent was last modified, ii) comparing the amount of time since host data stored in the source physical extent was last modified to a threshold amount of time, and iii) determining that the valid host data is infrequently accessed in response to the amount of time since host data stored in the source physical extent was last modified exceeding the threshold amount of time.

In another example, the disclosed technology may consolidate the valid host data in the non-volatile data storage at least in part by i) identifying the valid host data in multiple source physical extents, and ii) storing the highly compressed version of the valid host data into a total number of target physical extents that is less than a total number of the source physical extents.

In another example, the disclosed technology may store an initial version of host data into the source physical extent(s). Each time a portion of the initial version of host data stored in a source physical extent is modified, the disclosed technology may i) mark as invalid the portion of the initial the of host data in the source physical extent, and ii) store a modified version of that portion of the host data into a different physical extent.

In another example, the disclosed technology may identify the valid host data at least in part by identifying those portions of each source physical extent that were not modified since the initial version of host data was stored on the source physical extent.

In another example, the disclosed technology may execute garbage collection logic as a background process in a storage processor of a data storage system. The garbage collection logic may identify the valid host data, determine whether the valid host data is infrequently accessed by host I/O write requests, and compress the valid host data to generate the highly compressed version of the valid host data.

The disclosed technology may provide a number of improvements over previous technologies. For example, because the disclosed technology may be embodied at least in part within a background process, such as garbage collection logic or the like, embodiments of the disclosed technology may enable a data storage system to provide a high level of data reduction without negatively impacting the rapidity at which received host I/O requests are processed. In another example, because the host data being highly compressed is infrequently accessed by host I/O write requests, it is unlikely that after a large amount of CPU resources are consumed to highly compress the valid host data, a host I/O write request will soon be received that modifies and accordingly invalidates the highly compressed version. In another example, because the highly compressed version of the valid host data is stored into a target physical extent that is different from the source physical extent, the disclosed technology can be integrated into garbage collection logic that consolidates valid host data to create available physical extents from the source physical extents. In another example, when the valid host data is infrequently accessed by host I/O read requests, recompressing the valid host data using larger blocks of host data than were previously used during an initial compression results in a greater degree of data compression than was provided by the initial compression. In another example, also because the highly compressed version of the valid host data is stored into a target physical extent of non-volatile data storage that is different from the source physical extent, the disclosed technology can be integrated into a system for dynamically changing the performance tier of the non-volatile data storage on which the valid host data is stored. And in another example, because the host data that is deeply compressed to generate the highly compressed version is expressly identified as valid host data, the disclosed technology is compatible with a data storage system that performs log writes, in which modifications to host data result in previous versions being invalidated within the physical extents in which they are stored, and the modified portions being stored into other physical extents.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed on illustrating the principles of various embodiments of the disclosed technology.

DETAILED DESCRIPTION

Figure 1:
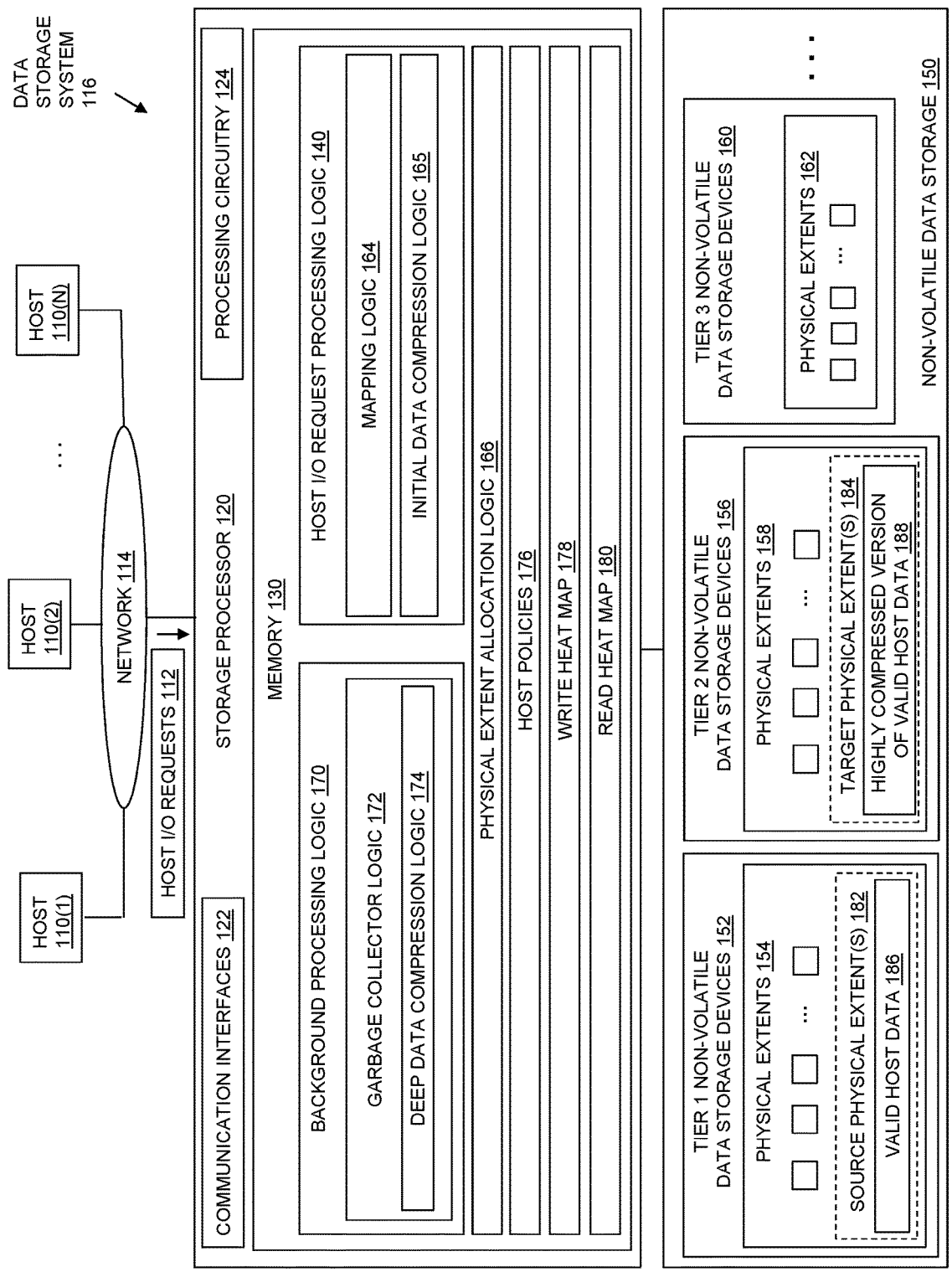
FIG. 1 is a block diagram showing an example of components in some embodiments.

Embodiments of the invention will now be described. The embodiments described herein are only examples of how features and principles of the invention may be embodied. The invention itself is accordingly broader than the specific embodiments described below.

The technology disclosed herein provides improvements over previous systems by identifying valid host data stored in at least one source physical extent of non-volatile data storage, and determining whether the valid host data is infrequently accessed by host I/O write requests. In response to a determination that the valid host data is infrequently accessed by host I/O write requests, the valid host data is compressed to generate a highly compressed version of the valid host data. The highly compressed version of the valid host data is then stored into at least one target physical extent of non-volatile data storage.

In some embodiments, the valid host data may initially be compressed by a first compression logic to create an initially compressed version of the valid host data that is stored into the non-volatile data storage. The valid host data may then be compressed to generate the highly compressed version of the valid host data at least in part by re-compressing the valid host data by a second compression logic. Re-compressing the valid host data by the second compression logic provides a higher level of data compression (e.g. a higher compression ratio) than was provided by the initial compression performed by the first compression logic, such that the highly compressed version of the valid host data is smaller than the initially compressed version of the valid host data.

In some embodiments, the valid host data may initially be compressed by the first compression logic in blocks of a first size. Further in response to determining that the valid host data is infrequently accessed by host I/O write requests, the disclosed technology may determine whether the valid host data is also infrequently accessed by host I/O read requests. In response to determining that the valid host data is also infrequently accessed by host I/O read requests, the valid host data may be recompressed by the second compression logic in larger blocks, e.g. in blocks of host data of a second size, the second size being larger than the first size.

In some embodiments, the non-volatile data storage may include multiple performance tiers of non-volatile data storage devices. A first performance tier may contain one or more non-volatile data storage devices, and a second performance tier may contain one or more other non-volatile data storage devices, the non-volatile data storage devices in the second performance tier having lower performance (e.g. higher response time) than the non-volatile data storage devices in the first performance tier. The source physical extent(s) may be located on one or more non-volatile data storage devices in the first performance tier. Further in response to determining that the valid host data is infrequently accessed by host I/O write requests, the target physical extent(s) may be allocated from the second performance tier, such that the target physical extent(s) is/are located on one or more non-volatile data storage devices in the second performance tier.

In some embodiments, whether the valid host data is infrequently accessed by host I/O write requests may be determined at least in part by i) determining an amount of time since host data stored in the source physical extent was last modified, ii) comparing the amount of time since host data stored in the source physical extent was last modified to a threshold amount of time, and iii) determining that the valid host data is infrequently accessed by host I/O write requests in response to the amount of time since host data stored in the source physical extent was last modified being greater than the threshold amount of time.

In some embodiments, the valid host data may be consolidated in the non-volatile data storage at least in part by i) identifying the valid host data in multiple source physical extents, and ii) storing the highly compressed version of the valid host data into a total number of target physical extents that is less than a total number of the source physical extents.

In some embodiments, an initial version of host data may be stored into the source physical extent(s). Each time a portion of the initial version of host data stored in a source physical extent is modified i) that portion of the initial version of host data that is marked as invalid in the source physical extent, and ii) a modified version of that portion of the initial version of host data is stored into a different physical extent.

In some embodiments, the valid host data may be identified at least in part by identifying those portions of the initial version of host data in each source physical extent that were not modified since the initial version of host data was stored on that source physical extent.

In some embodiments, garbage collection logic may be executed as a background process in a storage processor of a data storage system. As it executes, the garbage collection logic may identify the valid host data, determine whether the valid host data is infrequently accessed by host I/O write requests, and compress the valid host data to generate the highly compressed version of the valid host data.

FIG. 1 shows an example of an operational environment in which embodiments of the disclosed technology may operate, and an illustrative embodiment of components in the disclosed technology. As shown in FIG. 1, one or more host computers ("Hosts"), shown as host computers 110(1) through 110(N), and/or host applications executing in whole or in part on host computers 110(1) through 110(N), access non-volatile data storage provided by Data Storage System 116, for example over a Network 114. Hosts 110 may consist of or include one or more physical computers, and/or one or more virtual machines executing in a virtual execution environment.

Data Storage System 116 includes at least one Storage Processor 120, and Non-Volatile Data Storage 150 is communicably connected to Storage Processor 120. Non-Volatile Data Storage 150 includes some number of non-volatile data storage devices that are each communicably connected either directly or indirectly to Storage Processor 120. For example, one or more of the non-volatile data storage devices in Non-Volatile Data Storage 150 may be connected to Storage Processor 120 through a high speed bus, such as PCI Express (Peripheral Component Interconnect Express) or the like, and/or using one or more cables or communication media, such as SAS (Serial-Attached SCSI (Small Computer System Interface)) cables, and/or through one or more Ethernet cables, and/or other specific types of communication media and/or one or more communication or computer networks.

The non-volatile data storage devices in Non-Volatile Data Storage 150 include non-volatile data storage devices that are contained in different performance tiers. For purposes of illustration, the non-volatile data storage devices in Non-Volatile Data Storage 150 are shown including Tier 1 Non-Volatile Data Storage Devices 152, Tier 2 Non-Volatile Data Storage Devices 156, Tier 3 Non-Volatile Data Storage Devices 160, and so on. The disclosed technology may be embodied or configured to operate with any specific number of performance tiers of non-volatile data storage devices.

The non-volatile data storage devices in each individual performance tier have the same level of performance. For example, each non-volatile data storage device in Tier 1 Non-Volatile Data Storage Devices 152 has the same level of performance as each other non-volatile data storage data storage device in Tier 1 Non-Volatile Data Storage Devices 152, each non-volatile data storage device in Tier 2 Non-Volatile Data Storage Devices 156 has the same level of performance as each other non-volatile data storage data storage device in Tier 2 Non-Volatile Data Storage Devices 156, each non-volatile data storage device in Tier 3 Non-Volatile Data Storage Devices 160 has the same level of performance as each other non-volatile data storage data storage device in Tier 3 Non-Volatile Data Storage Devices 160, and so on.

The non-volatile data storage devices in each performance tier have a different level of performance with respect to the level of performance of the non-volatile data storage devices in each other performance tier. For example, Tier 1 Non-Volatile Data Storage Devices 152 have a different level of performance with respect to the levels of performance of both Tier 2 Non-Volatile Data Storage Devices 156 and Tier 3 Non-Volatile Data Storage Devices 160, Tier 2 Non-Volatile Data Storage Devices 156 have a different level of performance with respect to the levels of performance of both Tier 1 Non-Volatile Data Storage Devices 152 and Tier 3 Non-Volatile Data Storage Devices 160, and Tier 3 Non-Volatile Data Storage Devices 160 have a different level of performance with respect to the levels of performance of both Tier 2 Non-Volatile Data Storage Devices 156 and Tier 1 Non-Volatile Data Storage Devices 152.

The level of performance for each tier of non-volatile data storage devices may, for example, include or consist of the speed (e.g. data access time) of the non-volatile data storage devices in the tier. For example, Tier 1 Non-Volatile Data Storage Devices 152 may have a speed that is higher (e.g. a lower data access time) than the speed of both Tier 2 Non-Volatile Data Storage Devices 156 and Tier 3 Non-Volatile Data Storage Devices 160, Tier 2 Non-Volatile Data Storage Devices 156 may have a speed that is lower (e.g. a higher data access time) than the speed of Tier 1 Non-Volatile Data Storage Devices 152 but is higher (e.g. a lower data access time) than Tier 3 Non-Volatile Data Storage Devices 160, and Tier 3 Non-Volatile Data Storage Devices 160 may have a speed that is lower (e.g. a higher data access time) than the speed of both Tier 1 Non-Volatile Data Storage Devices 152 and Tier 2 Non-Volatile Data Storage Devices 156. In such embodiments, for example, Tier 1 Non-Volatile Data Storage Devices 152 may include or consist of one or more solid state drives, Tier 2 Non-Volatile Data Storage Devices 156 may include or consist of one or more magnetic disk drives, and Tier 3 Non-Volatile Data Storage Devices 160 may include or consist of one or more external cloud storage servers accessed by Storage Processor 120 through a cloud storage service or the like. In such embodiments, Tier 1 Non-Volatile Data Storage Devices 152 is the highest performance tier and contains the highest performance non-volatile data storage devices, Tier 2 Non-Volatile Data Storage Devices 156 is the second highest performance tier and contains the second highest performance non-volatile data storage devices, Tier 3 Non-Volatile Data Storage Devices 160 is the third highest performance tier and contains the third highest performance non-volatile data storage devices, and so on.

Data Storage System 116 may include one or more storage processors like Storage Processor 120. In some embodiments, multiple storage processors may be provided as circuit board assemblies, or "blades," which plug into a chassis that encloses and cools the storage processor. Those skilled in the art will recognize, however, that no particular configuration of storage processors is required, as any number of storage processors, including a single storage processor, may be provided, and that Storage Processor 120 may be any type of physical or virtual computing device that is capable of processing host I/O requests.

Network 114 may include or consist of any type of network or combination of networks, such as, for example, a storage area network (SAN), a local area network (LAN), a wide area network (WAN), the Internet, and/or some other type of communication or computer network or combination of networks.

Hosts 110(1-N) and/or host applications executing in whole or in part on Hosts 110(1-N) may logically connect to and communicate with the Storage Processor 120 using various technologies. For example, Host I/O Requests 112 conveyed from Hosts 110(1-N) to Storage Processor 120 may include block I/O requests (read requests and/or write requests) that are communicated from Hosts 110(1-N) to Storage Processor 120 using block storage interfaces and protocols such as, for example, the Small Computer System Interface (SCSI), Fibre Channel (FC), Serial Attached SCSI (SAS), Internet Small Computer System Interface (iSCSI), and/or other block storage interfaces and/or protocols. Host I/O Requests 112 conveyed from Hosts 110(1-N) to Storage Processor 120 may further include file I/O requests (read requests and/or write requests) communicated from Hosts 110(1-N) to the Storage Processor 120 using file storage interfaces and protocols such as, for example, the Network File System (NFS) distributed file system protocol, the Server Message Block (SMB)/Common Internet File System (CIFS) application-layer network protocol, Apple Filing Protocol (AFP), and/or other file storage interfaces and/or protocols. Storage Processor 120 may accordingly be configured to receive host I/O requests through block-based and/or file-based storage protocols, and to respond to host I/O requests of either type by reading host data from and/or writing host data to Non-Volatile Data Storage 150, as further described herein.

Storage Processor 120 may include one or more Communication Interfaces 122, Processing Circuitry 124, and Memory 130 coupled to Processing Circuitry 124. The Communication Interfaces 122 of Storage Processor 120 may include, for example, SCSI target adapters and/or network interface adapters that convert electronic and/or optical signals received over Network 114 into electronic form for use by Storage Processor 120.

Processing Circuitry 124 may, for example, be embodied as at least one processor core that is capable of reading and executing threads of program instructions as they are scheduled for execution. Processing Circuitry 124 may be integrated into a single central processing unit chip or chip package. Processing Circuitry 124 may be a subset of the total number of processor cores contained in Storage Processor 120, or may be the only processor core contained in Storage Processor 120.

Memory 130 may, for example, include or consist of relatively high speed, volatile memory, e.g. Dynamic Random Access Memory (DRAM). Processing Circuitry 124 and Memory 130 together form specialized control circuitry, which is constructed and arranged to carry out the specific methods and functions described herein. As shown in FIG. 1, Memory 130 stores specialized software components and data structures that may be provided at least in part in the form of executable program instructions. When the executable instructions of the software components shown in FIG. 1 are executed by Processing Circuitry 124, Processing Circuitry 124 performs the methods and functionality of the software described herein. Although certain specific software constructs are shown in FIG. 1 and described herein, those skilled in the art will recognize that Memory 130 may further include various other types of software constructs, which are not shown.

In the example of FIG. 1, the software components in Memory 130 include Host I/O Processing Logic 140, which provides program logic for processing and/or supporting the processing of the Host I/O Requests 112 received by Storage Processor 120, and/or program logic for providing one or more data storage related services. Host I/O Requests 112 may be processed by Host I/O Processing Logic 140, and may include host I/O requests (e.g. host I/O read requests and host I/O write requests) that are directed to various types of block data objects that are hosted by Data Storage System 116 using non-volatile data storage that is allocated from Non-Volatile Data Storage 150. Such block data objects may, for example, include logical volumes, logical units sometimes referred to as LUNs), and/or block-based virtual volumes (VVols). Host I/O Requests 112 processed by Host I/O Processing Logic 140 may also or alternatively include host I/O requests (e.g. host I/O read requests, host I/O write requests) directed to file data objects, such as files or file systems, that are also hosted by Data Storage System 116 using non-volatile data storage allocated from Non-Volatile Data Storage 150.

Physical Extent Allocation Logic 166 divides the physical non-volatile data storage space located on each one of the non-volatile data storage devices in Non-Volatile Data Storage 150 into multiple equal-sized physical extents (PEs), where each physical extent consists of a contiguous area of physical non-volatile data storage space (e.g. 2 MB). The disclosed technology may be embodied using any specific size of physical extents. In some embodiments, each physical extent allocated by Physical Extent Allocation Logic 166 may itself be distributed across multiple non-volatile data storage devices using RAID (Redundant Array of Independent Disks) technology.

In the example of FIG. 1, the physical extents located on Tier 1 Non-Volatile Data Storage Devices 152 are shown by Physical Extents 154, physical extents located on the Tier 2 Non-Volatile Data Storage Devices 156 are shown by Physical Extents 158, and physical extents located on the Tier 3 Non-Volatile Data Storage Devices 160 are shown by Physical Extents 162.

Host I/O Request Processing Logic 140 may include Mapping Logic 164. Mapping Logic 164 assists in processing Host I/O Requests 112 by identifying physical extents that have been allocated by Physical Extent Allocation Logic 166 to store host data written to corresponding data storage objects, e.g. logical volumes. For example, for a host I/O write request received by Data Storage System 116 and directed to a specific logical volume, Mapping Logic 164 may identify a set of physical extents allocated to store host data written to that logical volume, and the specific location or locations within those physical extents at which the host data indicated by that host I/O write request is to be stored, so that Host I/O Request Processing Logic 140 can store the indicated host data into Non-Volatile Data Storage 150. Similarly, for a host I/O read request received by Data Storage System 116 and directed to the same logical volume, Mapping Logic 164 may identify the same set of physical extents and the specific location or locations within those physical extents at which the host data requested by the host I/O read request is stored, so that Host I/O Request Processing Logic 140 can provide the requested host data back to the host that issued the host I/O read request. Mapping Logic 164 may maintain one or more data structures (e.g. mapping trees, etc.) that map each one of the logical volumes provided to Hosts 110 by the Data Storage System 116 to a corresponding set of physical extents allocated by Physical Extent Allocation Logic 166.

Host I/O Request Processing Logic 140 may further include Initial Data Compression Logic 165 that may be used to initially compress host data received in host I/O write requests before the host data is stored into Non-Volatile Data Storage 150.

Memory 130 may also store some number of host policies, shown by Host Policies 176. Host Policies 176 may be received from a system administrator or the like, and may include indications of how host data is to be stored among the performance tiers of Non-Volatile Data Storage 150, and/or how host data is to be compressed by Initial Data Compression Logic 165 and/or Deep Data Compression Logic 174.

Memory 130 may also store a Write Heat Map 178, containing indications of whether specific portions of host data are frequently or infrequently written, and/or a Read Heat Map 180, containing indications of whether specific portions of host data are frequently or infrequently read.

Background Processing Logic 170 in Memory 130 includes one or more background processes that is executed on Processing Circuitry 124 at times when Processing Circuitry 124 can be used without significantly delaying or otherwise interfering with the processing of Host I/O Requests 112 by Host I/O Request Processing Logic 140. As shown in FIG. 1, Background Processing Logic 170 may include a garbage collector process or the like such as Garbage Collector Logic 172, that operates at least in part by consolidating host data in Non-Volatile Data Storage 150 in order to generate free physical extents for re-allocation by Physical Extent Allocation Logic 166. As shown in FIG. 1, Garbage Collector Logic 172 may include Deep Data Compression Logic 174 is used to highly compress valid host data in Non-Volatile Data Storage 150 as further described herein.

During operation of the components shown in FIG. 1, Garbage Collector Logic 172 identifies valid host data stored in at least one source physical extent of non-volatile data storage. For example, Garbage Collector Logic 172 may identify Valid Host Data 186 in Source Physical Extent(s) 182. Garbage Collector Logic 172 also determines whether the Valid Host Data 186 is infrequently accessed by host I/O write requests. For example, Garbage Collector Logic 172 may check one or more corresponding portions of Write Heat Map 178 to determine whether Valid Host Data 186 is infrequently accessed by host I/O write requests. In some embodiments, Write Heat Map 178 may include indications (e.g. one or more timestamps) of when each of the Source Physical Extent(s) 182 were last modified, and Garbage Collector Logic 172 may compare a current time with the time(s) that Source Physical Extent(s) 182 were last modified, and if the difference(s) between the current time and the time(s) that Source Physical Extent(s) 182 were last modifies exceeds a predetermined threshold, Garbage Collector Logic 172 determines that Valid Host Data 186 is infrequently accessed by host I/O write requests.

In response to determining that Valid Host Data 186 is infrequently accessed by host I/O write requests, Garbage Collector Logic 172 may compress Valid Host Data 186 to generate a highly compressed version of the valid host data. For example, Garbage Collector Logic 172 may use Deep Data Compression Logic 174 to compress Valid Host Data 186, in order to generate a highly compressed version of Valid Host Data 186, shown by Highly Compressed Version of Valid Host Data 188. Garbage Collector Logic 172 may also store Highly Compressed Version of Valid Host Data 188 into at least one target physical extent. For example, Garbage Collector Logic 172 may store Highly Compressed Version of Valid Host Data 188 into Target Physical Extent(s) 184.

In some embodiments, Initial Data Compression Logic 165 may initially compress some or all of the host data that is received in Host I/O Requests 112, prior to the host data being stored in Non-Volatile Data Storage 150. Accordingly, Valid Host Data 186 may be initially compressed by Initial Data Compression Logic 185, to create an initially compressed version of Valid Host Data 186 that is stored into Source Physical Extent(s) 182. In such embodiments, when Garbage Collector Logic 172 uses Deep Data Compression Logic 174 to compress Valid Host Data 186 to generate Highly Compressed Version of Valid Host Data 188, the initially compressed version of Valid Host Data 186 may re-compressed by Deep Data Compression Logic 174. Re-compression of Valid Host Data 186 by Deep Data Compression Logic 174 provides a higher level of data compression (e.g. a higher compression ratio) than was provided by the initial compression performed by Initial Compression Logic 165, such that Highly Compressed Version of Valid Host Data 188 is smaller than the initially compressed version of Valid Host Data 186 that was initially stored in Source Physical Extent(s) 182.

The higher level of data compression provided by Deep Data Compression Logic 174 is typically more expensive in terms of system resource consumption (e.g. CPU utilization) than the initial compression that is provided by Initial Compression Logic 165. For example, in some embodiments, Storage Processor 120 may include hardware data compression logic, such as a hardware implementation of the DEFLATE lossless data compression technology (e.g. in Processing Circuitry 124). Such a hardware implementation of DEFLATE may, for example, include or consist of Intel® QAT (Quick Assist Technology). Such DEFLATE hardware may accept parameters that control the specific level of compression that is performed, e.g. by setting limits on one or more search distances used in various parts of the DEFLATE algorithm. For example, the values of certain parameters may control the chain length of a hash for finding a longest possible pattern match, and/or how far back into already compressed data that deduplication may be performed. By using limits on such search distances that are significantly higher than the limits used by Initial Data Compression Logic 165, Deep Data Compression Logic 174 can provide a higher level of compression than is provided by Initial Data Compression Logic 165, albeit at the cost of relatively higher system resource consumption. Because the relatively higher system resource consumption occurs within the context of a background process (i.e. Garbage Collector Logic 172), this higher system resource consumption does not adversely impact the ability of Host I/O Request Processing Logic 140 to rapidly process Host I/O Requests 112.

In some embodiments, Initial Data Compression Logic 165 may initially compress Valid Host Data 186 using blocks of host data that are relatively small, which may be less than optimal in terms of obtaining a high data compression ratio. For example, Initial Data Compression Logic 165 may initially compress all received host data, including Valid Host Data 186, by passing individual blocks of host data to Initial Data Compression Logic 165 for compression that each have a size that is equal to the page-size granularity of the application that issues Host I/O Requests 122, e.g. 4 KB. By performing initial compression on such relatively small sizes of host data blocks, Initial Data Compression Logic 165 effectively minimizes the decompression cost associated with subsequent reads of the compressed host data. However, in the case where host data is infrequently read, such decompression costs are not a significant performance consideration. Accordingly, further in response to determining that Valid Host Data 186 is infrequently accessed by host I/O write requests, Garbage Collector Logic 172 may also determine whether Valid Host Data 186 is infrequently accessed by host I/O read requests. For example, Garbage Collector Logic 172 may check a corresponding portion of Read Heat Map 180 to determine whether Valid Host Data 186 is infrequently accessed by host I/O read requests. In some embodiments, Read Heat Map 178 may include indications (e.g. one or more timestamps) of when Valid Host Data 186 was last read (e.g. when some portion of Valid Host Data 186 was last read from a cache in Host I/O Request Processing Logic 140), and Garbage Collector Logic 172 may compare a current time with the time that Source Physical Extent(s) 182 was last read, and if the difference between the current time and the time that Valid Host Data 186 was last read exceeds a predetermined threshold, Garbage Collector Logic 172 determines that Valid Host Data 186 is also infrequently accessed by host I/O read requests.

In response to determining that Valid Host Data 186 is also infrequently accessed by host I/O read requests, Garbage Collector Logic 172 may use Deep Data Compression Logic 174 to re-compress Valid Host Data 186 using individual blocks of Valid Host Data 186 that are larger than the 4 KB blocks of received host data that are individually compressed by Initial Data Compression Logic 165. For example, Garbage Collector Logic 172 may re-compress Valid Host Data 186 by passing individual 32 KB blocks of Valid Host Data 186 to Deep Data Compression Logic 174 for compression, or by passing individual 64 KB blocks of Valid Host Data 186 to Deep Data Compression Logic 174 for compression. Since compression performed on larger sized blocks of data generally results in higher compression ratios than can be achieved with smaller sized blocks, re-compressing Valid Host Data 186 in this way additionally increases the compression ratio resulting from the re-compression of Valid Host Data 186 by Deep Data Compression Logic 174, particularly in comparison with the compression ratio achieved when Valid Host Data 186 is initially compressed by Initial Data Compression Logic 165 using the relatively smaller sized individual blocks of host data.

As shown in the example of FIG. 1, Target Physical Extent(s) 184 may be located on a different performance tier than Source Physical Extent(s) 182. In some embodiments, whether the Target Physical Extent(s) 184 are allocated from the same or a different performance tier with respect to Source Physical Extent(s) 182 may be determined by Garbage Collector Logic 172 from the contents of Host Policies 176. Various combinations of providing high level compression and changing or not changing the performance tier onto which the Highly Compressed Version of Valid Host Data 188 is stored may be provided. For example, the contents of Host Policies 176 may cause Garbage Collector Logic 172 to allocate Target Physical Extent(s) 184 from a lower performance tier than the performance tier that contains Source Physical Extent(s) 182 in response to determining that the Valid Host Data 186 is infrequently accessed by host I/O write requests. In another example, the contents of Host Policies 176 may cause Garbage Collector Logic 172 to allocate Target Physical Extent(s) 184 from the same performance tier that contains Source Physical Extent(s) 182, but still perform high level data compression on Valid Host Data 186 using Deep Data Compression Logic 174, in response to determining that Valid Host Data 186 is infrequently accessed by host I/O write requests. In another example, the contents of Host Policies 176 may cause Garbage Collector Logic 172 to allocate Target Physical Extent(s) 184 from the same performance tier that contains Source Physical Extent(s) 182, but still perform high level data compression on Valid Host Data 186 using Deep Data Compression Logic 174 in response to a first determination that Valid Host Data 186 is infrequently accessed by host I/O write requests, and to move Highly Compressed Version of Valid Host Data 188 to a lower performance tier in response to determining that Highly Compressed Version of Valid Host Data 186 is subsequently determined to be infrequently accessed by host I/O write requests. And in another example, the contents of Host Policies 176 may cause Garbage Collector Logic 172 to allocate Target Physical Extent(s) 184 from a lower performance tier than the performance tier that contains Source Physical Extent(s) 182, except when the performance tier that contains Source Physical Extent(s) 182 is the lowest performance tier Non-Volatile Data Storage 150, in which case Target Physical Extent(s) 184 is allocated from the same performance tier that contains Source Physical Extent(s) 182.

In some embodiments, Garbage Collector Logic 172 may consolidate Valid Host Data 186 by i) identifying Valid Host Data in multiple Source Physical Extents 182, and ii) storing Highly Compressed Version of Valid Host Data 188 into a total number of Target Physical Extents 184 that is less than a total number of the Source Physical Extents 182. In this way, Garbage Collector Logic 172 may free a total number of Source Physical Extents 182 that is greater than the total number of Target Physical Extents 184 that are needed to store Highly Compressed Version of Valid Host Data 188.

In some embodiments, Garbage Collector Logic 172 may identify the Valid Host Data 186 at least in part by, for each physical extent in Source Physical Extent(s) 182, identifying those portions of an initial version of host data previously stored in that physical extent that have not been modified since the time the initial version was stored, and accordingly are currently valid. For example, a bit map data structure or the like may be maintained for each physical extent indicating which portions (e.g. blocks) of host data in the physical extent are currently valid, i.e. have not been modified since an initial version of host data was stored on the physical extent. In such embodiments, an efficient "log write" approach to storing host data may be employed. For example, using a log write approach, after an initial version of host data is stored into one of the Source Physical Extent(s) 182, each time a portion (e.g. block) of the initial version of host data is modified i) that portion of the initial version of host data is marked as invalid in the physical extent (e.g. the corresponding bit in the bit map for the block in the physical extent is flipped to indicate that the block in the physical extent is now invalid), and ii) a modified version of that portion of the initial version of host data is stored into a different physical extent (e.g. into another physical extent that has sufficient free space to store the modified version of the block). In this way, rather than overwriting the initial version of host data in a physical extent each time a portion of the initial version is modified, which in the case of RAID protected physical extents may be relatively expensive in terms of reading old parity and old data, writing the physical extent with the modified data and new parity, etc., the modified portion is simply and efficiently written to free space in a different physical extent. In addition, it should be recognized that the modified portion of the initial version of host data stored in a physical extent may be of a different size than the pre-modification portion of the initial version of host data, and writing the modified portion to free space in a different physical extent enables the modified portion to conveniently be written to a portion of free space that matches the size of the modified host data.

Figure 2:
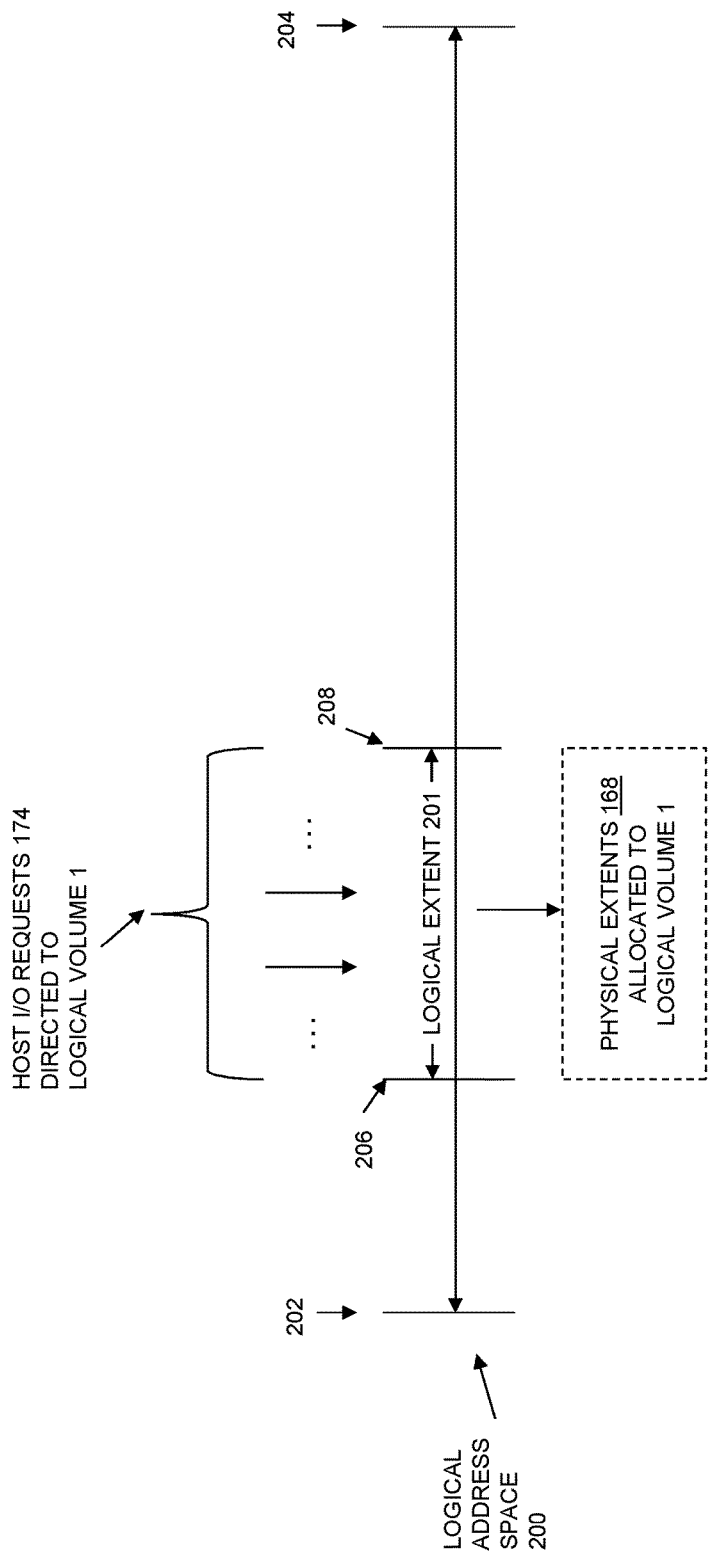
FIG. 2 illustrates a logical address space that may be provided by mapping logic in some embodiments.

FIG. 2 shows a Logical Address Space 200 that may be provided by Mapping Logic 164 in some embodiments. Processes and/or threads within Host I/O Processing Logic 140 may direct write and/or read operations resulting from processing Host I/O Requests 112 to logical addresses within Logical Address Space 200. As shown in FIG. 2, Logical Address Space 200 may extend from a lowest possible logical address 202 through a highest possible logical address 204. Logical Address Space 200 may be divided into multiple separate and discrete logical extents, where each logical extent consists of a unique contiguous range of logical addresses within the Logical Address Space 200. Each logical extent within Logical Address Space 200 may correspond to a data storage object, such as a logical volume that is accessed by some or all of Host I/O Requests 112. Each logical extent may be allocated (e.g. by Physical Extent Allocation Logic 166) a corresponding set of physical extents that are used to store host data indicated by write operations directed to logical addresses that fall within that logical extent, e.g. host data indicated by those write requests in Host I/O Requests 112 that are directed to a corresponding logical volume. For example, as shown in FIG. 2, Logical Address Space 200 may include a Logical Extent 201 consisting of the set of contiguous logical addresses that extend from some relatively lower logical address 206 through some relatively higher logical address 208. As further shown in FIG. 2, Host I/O Requests 174 may include or consist of those write I/O requests in Host I/O Requests 112 that are directed to a specific logical volume, e.g. Logical Volume 1, resulting in a number of write operations being performed by Host I/O Processing Logic 140 to one or more of the logical addresses that fall within the range of logical addresses in Logical Extent 201. As additionally shown in FIG. 2, Physical Extents 168 may include or consist of some number of physical extents that are allocated to store host data written to Logical Volume 1, and that contain the physical non-volatile data storage that is mapped by Mapping Logic 164 to the logical addresses in Logical Extent 201. In this way, Host I/O Request Processing Logic 140 may use the Logical Address Space 200 provided by Mapping Logic 164 to store the host data indicated by write I/O requests in Host I/O Requests 112 that are directed to Logical Volume 1 into portions of Physical Extents 168 that correspond to logical addresses in Logical Extent 201.

Figure 3:
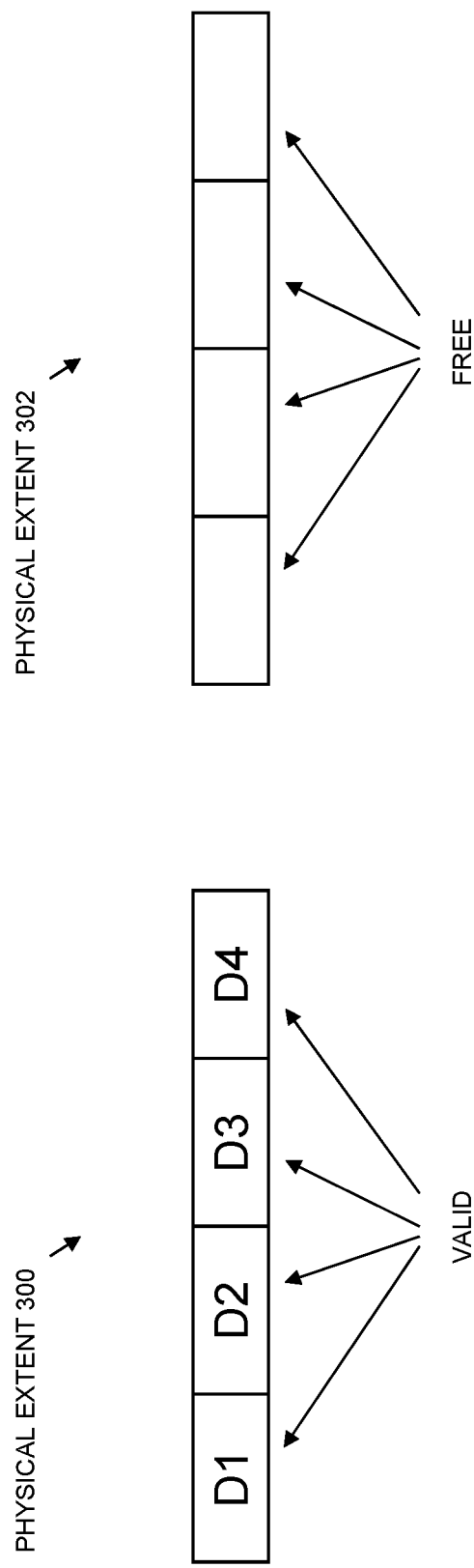
FIG. 3 is a block diagram showing a first physical extent of non-volatile data storage having an initial version of host data stored therein, and a second physical extent of non-volatile data storage having free space.

FIG. 3 is a block diagram showing a first physical extent of non-volatile data storage, e.g. Physical Extent 300, and a second physical extent of non-volatile data storage, e.g. Physical Extent 302. Physical Extent 300 is shown having an initial version of host data stored therein. The initial host data stored in Physical Extent 300 consists of four portions of host data (also referred to herein as "blocks" of host data), i.e. D1, D2, D3, and D4. Physical Extent 300 is shown having four portions of non-volatile data storage (also referred to herein as "blocks" of non-volatile data storage, sometimes also referred to as "pages" of non-volatile data storage), i.e. first, second, third, and fourth blocks, extending from left to right. Accordingly, when the initial version of host data is stored to Physical Extent 300, D1 is stored into the first block of Physical Extent 300, D2 is stored into the second block of Physical Extent 300, D3 is stored into the third block of Physical Extent 300, and D4 is stored into the fourth block of Physical Extent 300. At the time the initial version of host data is stored in Physical Extent 300, all four blocks of Physical Extent 300 are valid, e.g. the bits corresponding to each of the four blocks in Physical Extent 300 in a validity bit map associated with Physical Extent 300 are all set. In addition, at the time that the initial version of host data is stored into Physical Extent 300, a time stamp to equal to the time at which the initial version of host data was stored into Physical Extent 300 is stored in a portion of Write Heat Map 178 corresponding to Physical Extent 300. As also shown in FIG. 3, each of the four portions of Physical Extent 302 is free and available to store host data.

While the physical extents in FIG. 3 are shown for purposes of clear illustration and concise explanation including four blocks each, those skilled in the art will recognize that the disclosed technology is not limited to physical extents having any specific number of blocks.

Figure 4:
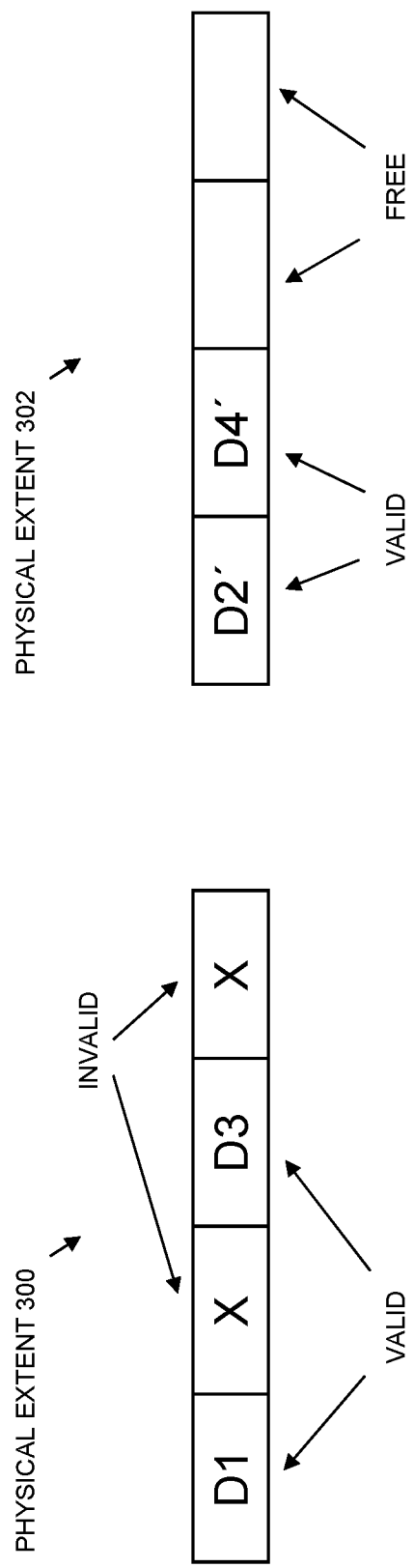
FIG. 4 is a block diagram showing the physical extents of FIG. 3 after modifications have been made to portions of the initial version of host data stored in the first physical extent.

FIG. 4 is a block diagram showing the two physical extents in FIG. 3 after modifications have subsequently been made to portions of the initial version of host data stored in Physical Extent 300. For example, D2 of the initial version of host data may be modified at a time $t_1$, e.g. by Host I/O Processing Logic 140 in response to processing one or more write I/O requests in Host I/O Requests 112. In response to modifications to D2, a modified version of D2, e.g. D2', is stored into a first block of Physical Extent 302. Further in response to modifications to D2, a time stamp $t_1$ equal to the time at which D2 was modified is stored in a portion of Write Heat Map 178 corresponding to Physical Extent 300, thus representing the last time host data stored in Physical Extent 300 was modified in Write Heat Map 178. Additionally, also in response to modifications to D2, the second block of Physical Extent 300 is marked as invalid, e.g. the bit corresponding to the second block in Physical Extent 300 in a validity bit map associated with Physical Extent 300 is cleared. Similarly, in response to storing D2' into the first block of Physical Extent 302, the first block of Physical Extent 302 is marked as valid, e.g. a bit corresponding to the first block of Physical Extent 302 in a validity bit map associated with Physical Extent 302 is set. Also in response to storing D2' into the first block of Physical Extent 302, a time stamp $t_1$ equal to the time at which D2' was stored in Physical Extent 302 is stored into a portion of Write Heat Map 178 corresponding to Physical Extent 302, thus representing the last time that host data stored in Physical Extent 302 was modified in Write Heat Map 178.

Subsequently, at a time $t_2$, D4 of the initial version of host data may be modified, e.g. again by Host I/O Processing Logic 140 in response to processing one or more write I/O requests in Host I/O Requests 112. In response to modifications to D4, a modified version of D4, e.g. D4', is stored into a second block of Physical Extent 302. Further in response to modifications to D4, a time stamp $t_2$ equal to the time at which D4 was modified is stored in the portion of Write Heat Map 178 corresponding to Physical Extent 300, thus updating the last time host data stored in Physical Extent 300 was modified in Write Heat Map 178. Additionally, also in response to the modifications to D4, the fourth block of Physical Extent 300 is marked as invalid, e.g. the bit corresponding to the fourth block in Physical Extent 300 in the validity bit map associated with Physical Extent 300 is cleared. Similarly, in response to storing D4' into the second block of Physical Extent 302, the second block of Physical Extent 302 is marked as valid, e.g. a bit corresponding to the second block of Physical Extent 302 in the validity bit map associated with Physical Extent 302 is set. Also in response to storing D4' into the second block of Physical Extent 302, a time stamp $t_2$ equal to the time at which D4' was stored in Physical Extent 302 is stored into a portion of Write Heat Map 178 corresponding to Physical Extent 302, thus representing the last time host data stored in Physical Extent 302 was modified in Write Heat Map 178.

Figure 5:
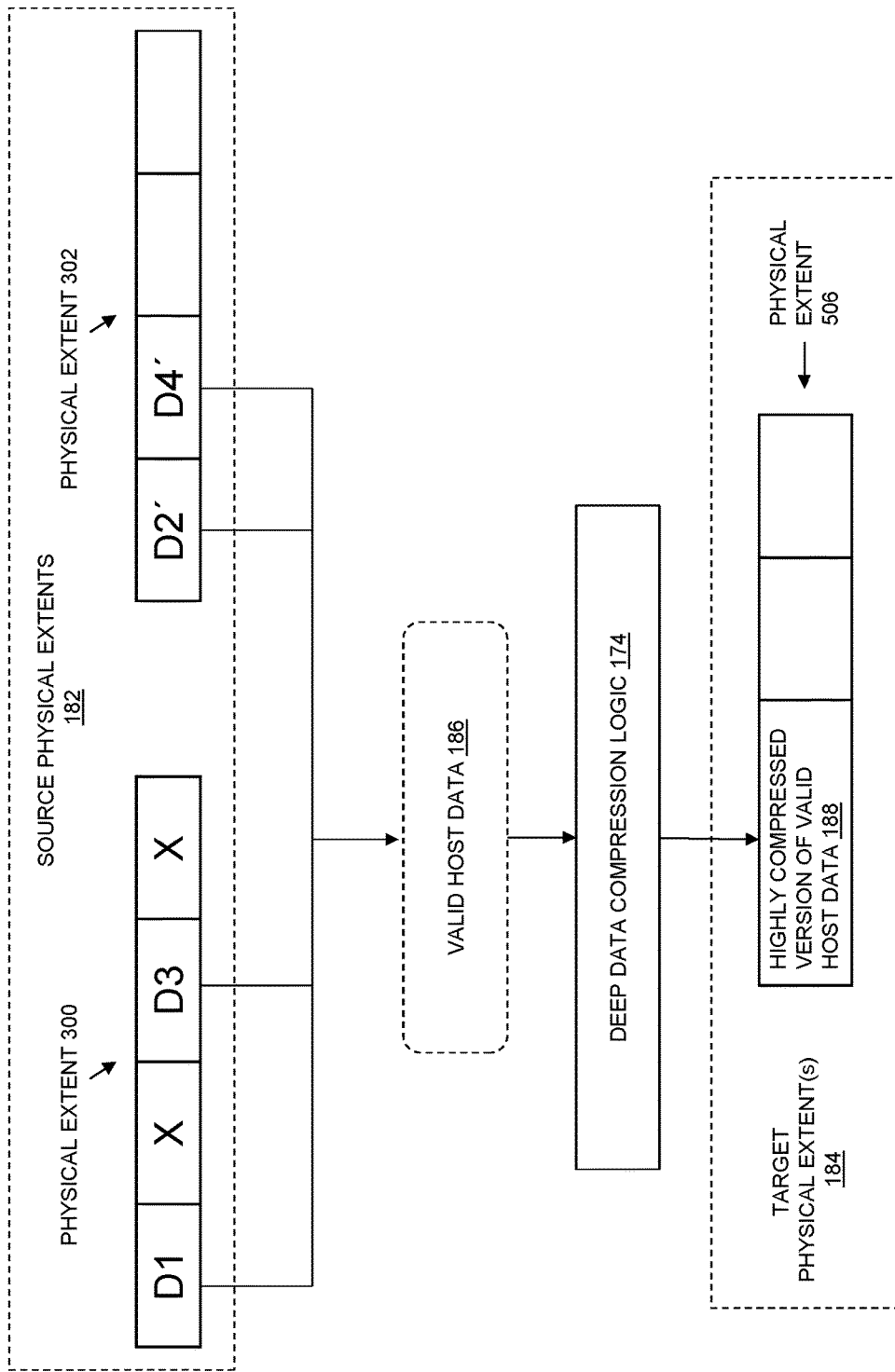
FIG. 5 is a block diagram showing deep compression of valid host data identified in multiple source physical extents consisting of the physical extents shown in FIGS. 3-4, and consolidation of the valid host data by storing a resulting highly compressed version of the valid host data into a single target physical extent.

FIG. 5 is a block diagram showing deep compression of valid host data identified in multiple source physical extents consisting of the two physical extents shown in FIGS. 3-4, and the consolidating the valid host data by storing a resulting highly compressed version of the valid host data into a smaller number of target physical extents, e.g. a single target physical extent. As shown in FIG. 5, at a time $t_3$ Garbage Collector Logic 172 may execute and i) examine a set of Source Physical Extents 182, and ii) identify Valid Host Data 186 as the host data blocks that are indicated as valid in Physical Extent 300 and Physical Extent 302, e.g. D1 stored in the first block of Physical Extent 300, D3 stored in the third block of Physical Extent 300, D2' stored in the first block of Physical Extent 302, and D4' stored in the second block of Physical Extent 302. At time $t_3$, Write Heat Map 178 indicates that $t_2$ was the last time that host data stored in Physical Extent 300 was modified, and also that $t_2$ was the last time that host data stored in Physical Extent 302 was modified. Garbage Collector Logic 172 compares the current time $t_3$ to $t_2$, and determines that the difference between $t_3$ and $t_2$ exceeds a predetermined threshold amount of time. Accordingly, Garbage Collector Logic 172 determines that D1, D3, D2' and D4' are all infrequently accessed by host I/O write requests, and that therefore Valid Host Data 186 is infrequently accessed by host I/O write requests.

In response to determining that Valid Host Data 186 is infrequently accessed by host I/O write requests, Garbage Collector Logic 172 checks Host Policies 176 to determine what performance tier Target Physical Extent(s) 184 should be allocated from. Garbage Collector Logic 172 determines that Target Physical Extent 184 should be allocated from Tier 2 Non-Volatile Data Storage Devices 156, and accordingly requests that Physical Extent Allocation Logic 166 allocate Physical Extent 506. In the example of FIG. 5, Target Physical Extent(s) 184 includes only one physical extent, e.g. Physical Extent 506. The determination of which performance tier to allocate the target physical extent(s) from may also or alternatively be responsive at least in part to whether Valid Host Data 186 is infrequently accessed by host I/O read requests.

Garbage Collector Logic 172 then passes Valid Host Data 186 to Deep Data Compression Logic 174 for compression. For example, in a case where Garbage Collector Logic 172 also determines that Valid Host Data 186 is also infrequently accessed by host I/O read requests, Garbage Collector Logic 172 may pass Valid Host Data 186 to Deep Data Compression Logic 174 in relatively large blocks of host data, e.g. 32 KB or 64 KB blocks of host data, whereas host data may be passed to Initial Data Compression Logic 165 in relatively small blocks, e.g. 4 KB blocks. For example, Garbage Collector Logic 172 may determine that Valid Host Data 186 is also infrequently accessed by host I/O read requests by first comparing the current time to a timestamp maintained in Read Heat Map 180 indicating the last time that the host data stored in Physical Extent 300 was read, and to a timestamp maintained in Read Heat Map 180 indicating the last time that the host data stored in Physical Extent 302 was read. Garbage Collector Logic 172 may determine that Valid Host Data 186 is infrequently read in response to determining that both i) the difference between the current time and the last time that the host data stored in Physical Extent 300 was read is greater than a predetermined threshold amount of time, and ii) the difference between the current time and the last time that the host data stored in Physical Extent 302 was read is greater than the predetermined threshold amount of time.

Garbage Collector Logic 172 then stores the output of Deep Data Compression Logic 174, e.g. Highly Compressed Version of Valid Host Data 188, into Physical Extent 506. After Highly Compressed Version of Valid Host Data 188 has been successfully stored into Physical Extent 506, Garbage Collector Logic 174 frees Physical Extent 300 and Physical Extent 302 for reallocation by Physical Extent Allocation Logic 166. For example, Physical Extent 300 and Physical Extent 302 may be added to a free list of physical extents maintained for Tier 1 Non-Volatile Data Storage Devices 152. Because the number of freed physical extents freed (e.g. 2) is greater than the number of physical extents used to store the Highly Compressed Version of Valid Host Data 188, the example shown in FIG. 5 results in a net gain of 1 free physical extent that is available for reallocation. In addition, because Highly Compressed Version of Valid Host Data 188 is stored in a physical extent allocated from a lower performance tier than the two source physical extents, the freeing of the two source physical extents enables Data Storage System 116 to provide higher performance non-volatile data storage to a larger amount of host data.

Figure 6:
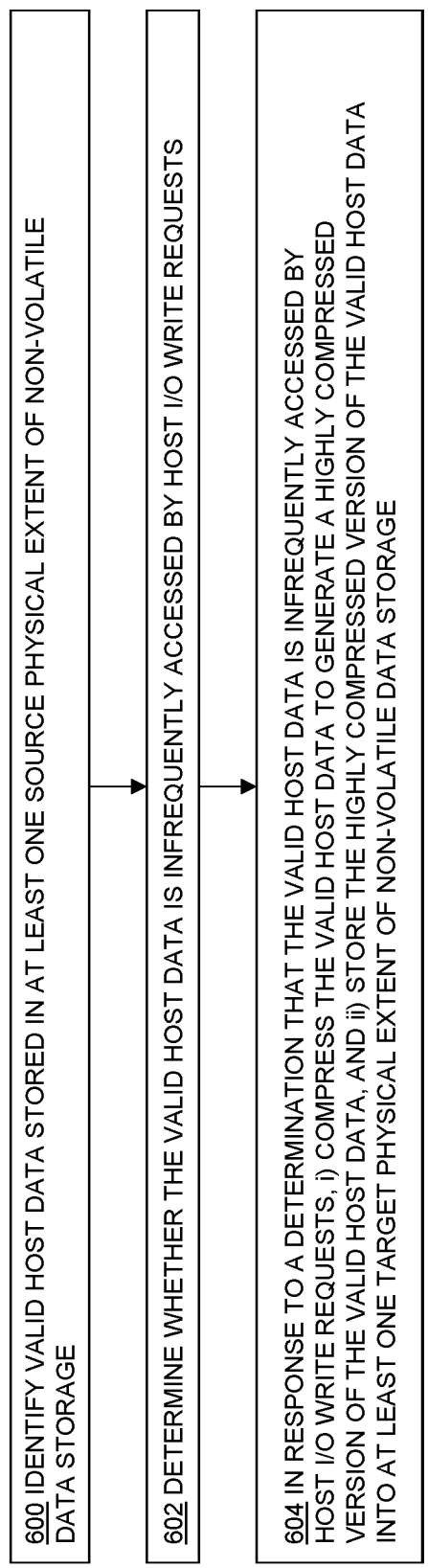
FIG. 6 is a first flow chart illustrating steps that may be performed during operation of some embodiments.

FIG. 6 is a first flow chart illustrating steps that may be performed during operation of some embodiments. As shown in FIG. 6, at step 600 valid host data stored in at least one source physical extent of non-volatile data storage is identified.

At step 602, a determination is made as to whether the valid host data is infrequently accessed by host I/O write requests.

At step 604, in response to a determination that the valid host data is infrequently accessed by host I/O write requests:

i) the valid host data is compressed to generate a highly compressed version of the valid host data, and ii) the highly compressed version of the valid host data is stored into at least one target physical extent of non-volatile data storage.

As will be appreciated by those skilled in the art, the technologies disclosed herein may be embodied as a system, method or computer program product. Accordingly, each specific feature of the present disclosure may be embodied using hardware, software (including firmware, resident software, micro-code, etc.) or a combination of software and hardware. Furthermore, the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media.

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   initially compressing valid host data by a first compression logic located in a storage processor, upon receipt of the valid host data by the storage processor from the an application that issues host I/O requests to the storage processor, prior to the valid host data being stored by the storage processor into non-volatile data storage, to generate an initially compressed version of the valid host data that is stored into the non-volatile data storage, wherein the valid host data is initially compressed by the first compression logic in blocks of host data having a first size that is equal to a page-size granularity of the application that issues the host I/O requests;
   identifying the initially compressed version of the valid host data stored in at least one source physical extent of the non-volatile data storage;
   determining whether the initially compressed version of the valid host data is infrequently accessed by host I/O write requests; and
   in response to determining that the initially compressed version of the valid host data is infrequently accessed by the host I/O write requests, recompressing the valid host data by a second compression logic located in the storage processor, in blocks of host data having a second size, wherein the second size is a multiple of the first size, to generate a highly compressed version of the valid host data, and storing the highly compressed version of the valid host data into at least one target physical extent of non-volatile data storage, wherein the highly compressed version of the valid host data is smaller than the initially compressed version of the valid host data stored in the non-volatile data storage.

2. The method of claim 1, further comprising:
   further in response to determining that the initially compressed version of the valid host data is infrequently accessed by host I/O write requests, determining whether the valid host data is also infrequently accessed by host I/O read requests; and
   wherein recompressing the valid host data by the second compression logic located in the storage processor is performed in response to determining that the valid host data is also infrequently accessed by host I/O read requests.

3. The method of claim 2, wherein the non-volatile data storage comprises multiple performance tiers of non-volatile data storage devices, including a first performance tier containing one or more non-volatile data storage devices and a second performance tier containing one or more other non-volatile data storage devices, wherein the non-volatile data storage devices in the second performance tier have lower performance than the non-volatile data storage devices in the first performance tier, and wherein the at least one source physical extent is located on at least one non-volatile data storage device in the first performance tier, the method further comprising:
   further in response to determining that the initially compressed version of the valid host data is infrequently accessed by host I/O write requests, allocating the at least one target physical extent from the second performance tier, such that the at least one target physical extent is located on at least one non-volatile data storage device in the second performance tier.

4. The method of claim 1, wherein determining whether the initially compressed version of the valid host data is infrequently accessed by host I/O requests comprises:
   determining an amount of time since host data stored in the source physical extent was last modified;
   comparing the amount of time since host data stored in the source physical extent was last modified to a threshold amount of time; and
   determining that the valid host data is infrequently accessed by host I/O write requests in response to the amount of time since host data stored in the source physical extent was last modified exceeding the threshold amount of time.

5. The method of claim 4, further comprising consolidating the valid host data in the non-volatile data storage at least in part by:
   identifying the initially compressed version of the valid host data in multiple source physical extents; and
   storing the highly compressed version of the valid host data into a total number of target physical extents that is less than a total number of the source physical extents.

6. The method of claim 1, further comprising:
   storing the initially compressed version of the valid host data into the source physic al extent; and
   each time a portion of initially compressed version of the valid host data stored in the source physical extent is modified:
   marking as invalid that portion of the initially compressed version of the valid host data in the source physical extent, and
   storing a modified version of that portion of the initially compressed version of the valid host data into a different physical extent.

7. The method of claim 6, wherein identifying the initially compressed version of the valid host data comprises identifying those portions of the initially compressed version of the valid host data in the source physical extent that were not modified since the initially compressed version of the valid host data was stored into the source physic al extent.

8. The method of claim 1, further comprising:
   executing garbage collection logic as a background process in the storage processor; and
   performing the steps of identifying the initially compressed version of the valid host data, determining whether the initially compressed version of the valid host data is infrequently accessed by host I/O write requests, and recompressing the valid host data to generate the highly compressed version of the valid host data, by execution of the garbage collection logic.

9. A data storage system, comprising:
   processing circuitry and memory coupled to the processing circuitry, the memory storing instructions, wherein the instructions, when executed by the processing circuitry, cause the processing circuitry to:
   initially compress valid host data by a first compression logic located in a storage processor, upon receipt of the valid host data by the storage processor from the an application that issues host I/O requests to the storage processor, prior to the valid host data being stored by the storage processor into non-volatile data storage, to generate an initially compressed version of the valid host data that is stored into the non-volatile data storage, wherein the valid host data is initially compressed by the first compression logic in blocks of host data having a first size that is equal to a page-size granularity of the application that issues the host I/O requests;
   identify the initially compressed version of the valid host data stored in at least one source physical extent of the non-volatile data storage;
   determine whether the initially compressed version of the valid host data is infrequently accessed by host I/O write requests; and
   in response to a determination that the initially compressed version of the valid host data is infrequently accessed by the host I/O write requests,
   recompressing the valid host data by a second compression logic located in the storage processor, in blocks of host data having a second size, wherein the second size is a multiple of the first size, to generate a highly compressed version of the valid host data, and storing the highly compressed version of the valid host data into at least one target physical extent of non-volatile data storage, wherein the highly compressed version of the valid host data is smaller than the initially compressed version of the valid host data stored in the non-volatile data storage.

10. The data storage system of claim 9, wherein the instructions, when executed by the processing circuitry, further cause the processing circuitry to:
   further in response to a determination that the initially compressed version of the valid host data is infrequently accessed by host I/O write requests, determine whether the valid host data is also infrequently accessed by host I/O read requests; and
   wherein the valid host data is recompressed by the second compression logic located in the storage processor in response to a determination that the valid host data is also infrequently accessed by host I/O read requests.

11. The data storage system of claim 10, wherein the non-volatile data storage comprises multiple performance tiers of non-volatile data storage devices, including a first performance tier containing one or more non-volatile data storage devices and a second performance tier containing one or more other non-volatile data storage devices, wherein the non-volatile data storage devices in the second performance tier have lower performance than the non-volatile data storage devices in the first performance tier, and wherein the at least one source physical extent is located on at least one non-volatile data storage device in the first performance tier, and wherein the instructions, when executed by the processing circuitry, further cause the processing circuitry to:
   further in response to a determination that the initially compressed version of the valid host data is infrequently accessed by host I/O write requests, allocate the at least one target physical extent from the second performance tier, such that the at least one target physical extent is located on at least one non-volatile data storage device in the second performance tier.

12. The data storage system of claim 9, wherein execution of the instructions by the processing circuitry causes the processing circuitry to determine whether the initially compressed version of the valid host data is infrequently accessed by host I/O requests at least in part by causing the processing circuitry to:
   determine an amount of time since host data stored in the source physical extent was last modified;
   compare the amount of time since host data stored in the source physical extent was last modified to a threshold amount of time; and determine that the valid host data is infrequently accessed by host I/O write requests in response to the amount of time since host data stored in the source physical extent was last modified exceeding the threshold amount of time.

13. The data storage system of claim 12, wherein the instructions, when executed by the processing circuitry, further cause the processing circuitry to consolidate the valid host data in the non-volatile data storage at least in part by causing the processing circuitry to:
identify the initially compressed version of the valid host data in multiple source physical extents; and
store the highly compressed version of the valid host data into a total number of target physical extents that is less than a total number of the source physical extents.

14. The data storage system of claim 9, wherein the instructions, when executed by the processing circuitry, further cause the processing circuitry to:
store the initially compressed version of the valid initial version host data into the source physical extent; and
each time a portion of the initially compressed version of the valid host data stored in the source physical extent is modified:
mark as invalid that portion of the initially compressed version of the valid host data in the source physical extent, and
store a modified version of that portion of the initially compressed version of the valid host data into a different physical extent.

15. The data storage system of claim 14, wherein the instructions, when executed by the processing circuitry, cause the processing circuitry to identify the initially compressed version of the valid host data at least in part by causing the processing circuitry to identify those portions of the initially compressed version of the valid host data in the source physical extent that were not modified since the initially compressed version of the valid host data was stored into the source physical extent.

16. The data storage system of claim 9, wherein the instructions include garbage collection logic, and wherein executing the instructions by the processing circuitry further causes the processing circuitry to:
execute the garbage collection logic as a background process in the storage processor; and
wherein execution of the garbage collection logic by the processing circuitry causes the processing circuitry to identify the initially compressed version of the valid host data, determine whether the initially compressed version of the valid host data is infrequently accessed by host I/O write requests, and recompress the valid host data to generate the highly compressed version of the valid host data.

17. A computer program product, comprising:
a non-transitory, computer-readable medium having instructions stored thereon that, when executed by processing circuitry in a data storage system, cause the processing circuitry to perform a method comprising the steps of:
initially compress valid host data by a first compression logic located in a storage processor, upon receipt of the valid host data by the storage processor from the an application that issues host I/O requests to the storage processor, prior to the valid host data being stored by the storage processor into non-volatile data storage, to generate an initially compressed version of the valid host data that is stored into the non-volatile data storage, wherein the valid host data is initially compressed by the first compression logic in blocks of host data having a first size that is equal to a page-size granularity of the application that issues the host I/O requests;
identifying the initially compressed version of the valid host data stored in at least one source physical extent of the non-volatile data storage,
determining whether the initially compressed version of the valid host data is infrequently accessed by host I/O write requests, and
in response to determining that the initially compressed version of the valid host data is infrequently accessed by the host I/O write requests, recompressing the valid host data by a second compression logic located in the storage processor, in blocks of host data having a second size, wherein the second size is a multiple of the first size, to generate a highly compressed version of the valid host data, and storing the highly compressed version of the valid host data into at least one target physical extent of non-volatile data storage, wherein the highly compressed version of the valid host data is smaller than the initially compressed version of the valid host data stored in the non-volatile data storage.

18. The method of claim 1, wherein the non-volatile data storage comprises multiple performance tiers of non-volatile data storage devices, including a first performance tier containing one or more non-volatile data storage devices and a second performance tier containing one or more other non-volatile data storage devices, wherein the non-volatile data storage devices in the second performance tier have lower performance than the non-volatile data storage devices in the first performance tier;
wherein the initially compressed version of the valid host data is stored in the non-volatile data storage devices in the first performance tier; and
wherein the highly compressed version of the valid host data is stored in the non-volatile data storage devices in the second performance tier.

* * * * *